United States Patent [19]

Kim

[11] Patent Number: 5,774,537
[45] Date of Patent: Jun. 30, 1998

[54] METHOD AND APPARATUS FOR DISPLAYING MULTIPLE LANGUAGES IN KEY PHONE SYSTEM

[75] Inventor: Su-Seok Kim, Gumi, Rep. of Korea

[73] Assignee: SamSung Electronics Co., Ltd., Suwon, Rep. of Korea

[21] Appl. No.: 700,061

[22] Filed: Aug. 19, 1996

[30] Foreign Application Priority Data

Aug. 24, 1995 [KR] Rep. of Korea .................. 1995/26431

[51] Int. Cl.⁶ ...................................................... H04M 1/00
[52] U.S. Cl. ............................................................ 379/157
[58] Field of Search .................................. 379/142, 157, 379/201, 214, 144, 155, 156, 198, 67, 122, 136, 265, 266; 455/564, 566; 381/80

[56] References Cited

U.S. PATENT DOCUMENTS

| | | | |
|---|---|---|---|
| 3,720,788 | 3/1973 | Hashimoto | 381/80 |
| 4,185,282 | 1/1980 | Pick . | |
| 4,654,798 | 3/1987 | Taki et al. | 364/419 |
| 4,700,322 | 10/1987 | Benbassat et al. | 364/513.5 |
| 4,736,405 | 4/1988 | Akiyama . | |
| 4,872,196 | 10/1989 | Royer et al. | 340/365 |
| 4,882,681 | 11/1989 | Brotz | 364/419 |
| 4,916,730 | 4/1990 | Hashimoto | 379/70 |
| 4,935,956 | 6/1990 | Hellwarth et al. . | |
| 4,958,366 | 9/1990 | Hashimoto | 379/70 |
| 5,014,301 | 5/1991 | Maltezos . | |
| 5,204,861 | 4/1993 | Wiebe . | |
| 5,305,374 | 4/1994 | Snyder | 379/67 |
| 5,309,505 | 5/1994 | Szlam et al. . | |
| 5,386,459 | 1/1995 | Veeneman et al. . | |
| 5,412,712 | 5/1995 | Jennings | 379/88 |
| 5,436,436 | 7/1995 | Matsukawa . | |
| 5,463,676 | 10/1995 | Ohsawa . | |
| 5,659,597 | 8/1997 | Baries et al. | 455/563 |

*Primary Examiner*—Curtis A. Kuntz
*Assistant Examiner*—Rexford N. Barnie
*Attorney, Agent, or Firm*—Robert E. Bushnell, Esq.

[57] ABSTRACT

A method and apparatus for a key phone system stores languages of various countries in a data base, performs a multiplexing operation in a language of a corresponding country as the need arises, and displays all kinds of function and operational information in the corresponding language. When the power is turned on, the method and apparatus displays an initial language; checks whether or not a language changing key has been operated, and if the language changing key has been operated, designates a corresponding language index; and changes the initial language into the designated corresponding language and displays all kinds of functions and operational information in the designated language.

3 Claims, 2 Drawing Sheets

5,774,537

METHOD AND APPARATUS FOR DISPLAYING MULTIPLE LANGUAGES IN KEY PHONE SYSTEM

CLAIM OF PRIORITY

This application make reference to, incorporates the same herein, and claims all benefits accruing under 35 U.S.C §119 from an application entitled METHOD FOR DISPLAYING MULTIPLE LANGUAGES IN KEY PHONE SYSTEM earlier filed in the Korean Industrial Property Office on 24 Aug. 1995 and assigned Ser. No. 26431/1995.

BACKGROUND OF THE INVENTION

1. Field of the Invention

The present invention relates to a method and apparatus for displaying multiple languages in a key phone system and, in particular, to a method and apparatus for displaying multiple languages in a key phone system, by changing an initial language into a corresponding language and displaying all kinds of functions and information in the changed language on a liquid crystal display (LCD).

2. Description of the Related Art

Generally, a key phone system includes an LCD display for displaying all kinds of functions and operational information in language characters. Since a conventional key phone system is set to display all kinds of functions and operational information in one of the above language characters upon manufacture, it is difficult to use the above key phone system in other countries using other languages. For this reason, it results in a problem in that the key phone system must separately be made in conformity with respective languages of various countries, so as to remove the above difficulties.

The earlier effort entitled DISPLAYED KEYBOARD INDICIA of Pick, U.S. Pat. No. 4,185,282, attempts to provide a computer controlled keyboard capable of displaying information in more than one language, depending on the operation of a selected key. I have found that Pick is unable to use the keyboard with a telephone system, much less a key telephone system.

A more recent effort, the IC CARD CONTROLLED SYSTEM FOR SELECTING A LANGUAGE FOR A VISUAL MESSAGE DISPLAY of Matsukawa, U.S. Pat. No. 5,436,436, uses an IC card controlled system for selecting a language for a visual message display. The computer controlled system automatically displays information on a display in a language determined by the information contained in an IC card. Matsukawa is unable to use its system in a key telephone system and does not enable the use of a language changing key to change the display language. Moreover, Matsukawa does not provide an initial display of a default language when power is turned on.

The INTERNATIONAL SPEAKER TELEPHONE of Maltezos, U.S. Pat. No. 5,014,301, shows an international speaker telephone which provides multilingual voice instructions to the user in a language selected by the user. Maltezos lacks an adequate visual display as well as the use of a language changing key and instead inconveniently has the user select the language by operating the usual telephone keypad.

The recent METHOD OF DEFINING OPERATION OF SWITCHING SYSTEM PERIPHERALS of Veeneman, et al, U.S. Pat. No. 5,386,459 endeavors to provide an operation of switching system peripherals in which a computer controlled display can provide instructions in several different languages depending upon a selection by a user. As with the above noted references, Veeneman, et al. is unable to accomodate the use of its system with a key telephone system and lacks an effective language changing key and instead rather utilizes software and a computer screen to control its system.

SUMMARY OF THE INVENTION

It is therefore an object of the present invention to provide an improved key phone system.

It is another object to provide a method for storing languages of various countries in a data base, performing a multiplexing operation in a language of a corresponding country whenever the need arises, and displaying all kinds of function and operational information in the corresponding language, thereby removing the foregoing problem.

These and other objects can be achieved according to the present invention with a method and apparatus for displaying multiple languages in a key phone system. When the power is turned on, an initial language is displayed and a determination is made of whether or not a language changing key has been operated. If the language changing key has been operated, a corresponding language index is designated and the initial language is changed into the designated corresponding language and all kinds of functions and operational information about the operational system are visually displayed in the designated language.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

In the following description, numerous specific details are set forth to provide a more through understanding of the present invention. It will be apparent, however, to one skilled in the art that the present invention may be practiced without these specific details. A detailed description of known functions and constructions unnecessarily obscuring the subject matter of the present invention have been avoided in the following description.

Figure 1:
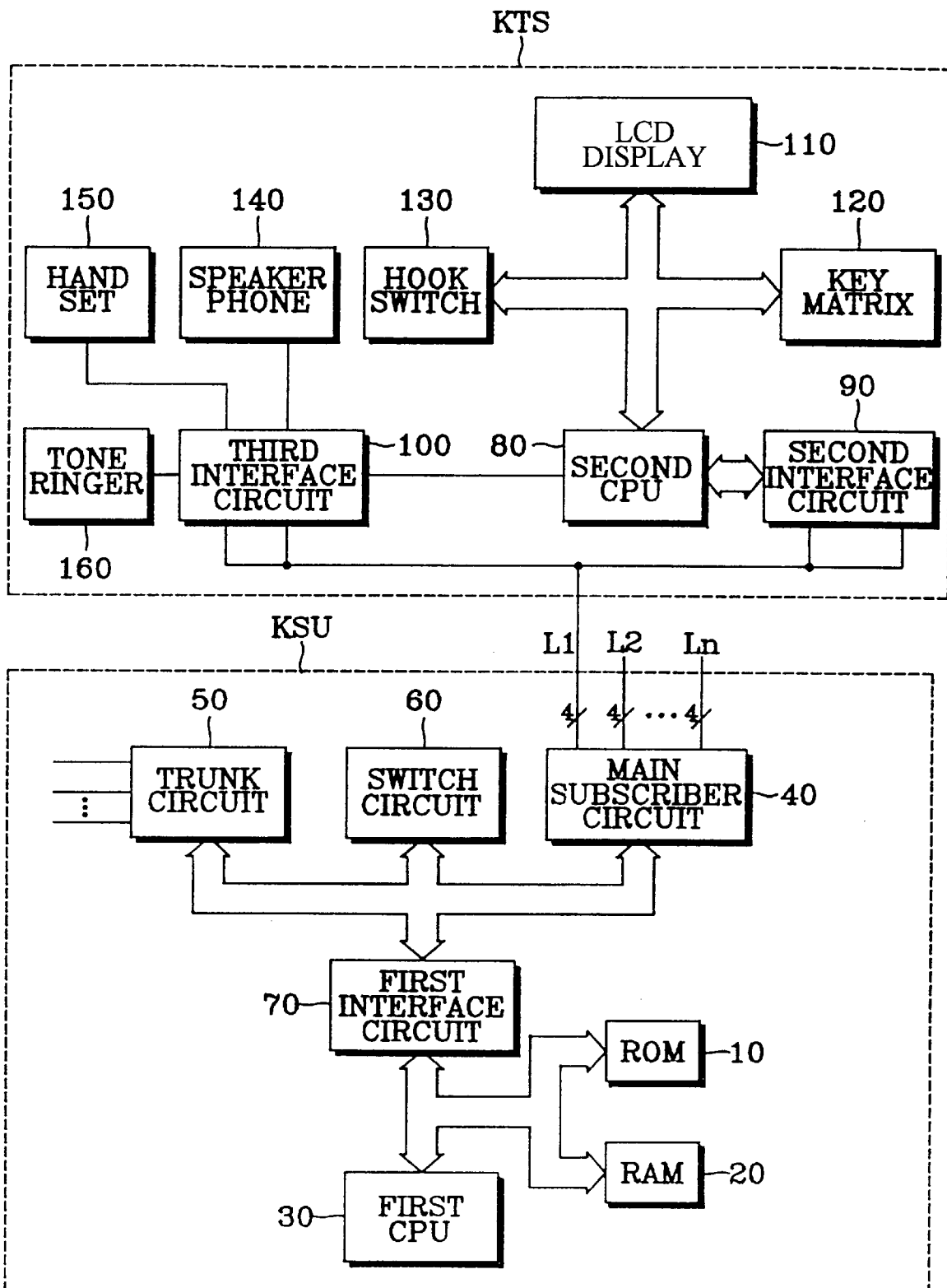
FIG. 1 is a diagram illustrating the construction of a key phone system assembled according to the prenciples of present invention.

FIG. 1 is a diagram illustrating the construction of a key phone system, which is comprised of a key service unit (hereinafter, referred to as KSU) and a key telephone set (hereinafter, referred to as KTS).

As can be seen from FIG. 1, the KSU is constructed with: a read only memory 10 (hereinafter, referred to as a ROM) for storing fixed service data and a program for performing functions of the key phone system; a random access memory 20 (hereinafter, referred to as a RAM) which is used as each service class, system modes, programs, and data processing areas and temporarily stores processed data; a first central processing unit 30 (hereinafter, referred to as a CPU) 30 for controlling a speech switch and providing all kinds of services; a main subscriber circuit 4, connected to a station subscriber through a transmitting line L1–Ln, and transmitting voice and data; a trunk circuit 50 connected to a central line, for compensating ring detection, pulse transmission, overpower protection and switch loss; a switch circuit 60 for forming a speech path between the trunk circuit 50 and the main subscriber circuit 40; and a first interface circuit 70, for smoothly inputting/outputting control data between the first CPU 30 and the trunk circuit 50, the switch circuit 60, and the main subscriber circuit 40.

The KTS of FIG. 1 as, constructed, may also use a second CPU 80 for processing commands according to input of keys, controlling a speech circuit unit, displaying the ring transmission and all kinds of functions, and processing transmitting/receiving data; a second interface circuit 90 for interfacing the power supplied from the main subscriber circuit 40 of the KSU to each of the circuits and for translating the data between the main subscriber circuit 40 of the KSU and the second CPU 80; a third interface circuit 100 for translating a voice speech with the main subscriber circuit 40 of the KSU; a key matrix 120 for inputting dial and key commands by connection with the second CPU; a handset 150 for forming the speech by connection with the third interface circuit 100; a speakerphone 140 capable of forming the speech by connection with the third interface circuit 100 in an on-hook state; a tone ringer 160 for generating an incoming signal; an LCD display 110 for displaying messages such as a dial number, a counterpart's telephone number upon the station speech, a central number of a central interface, and, when in the on-line state, the holding, the reservation, and the incoming refusal; and a hook switch 130 for controlling the interface with a transmitting path line in accordance with the disposition of the handset 150.

Figure 2:
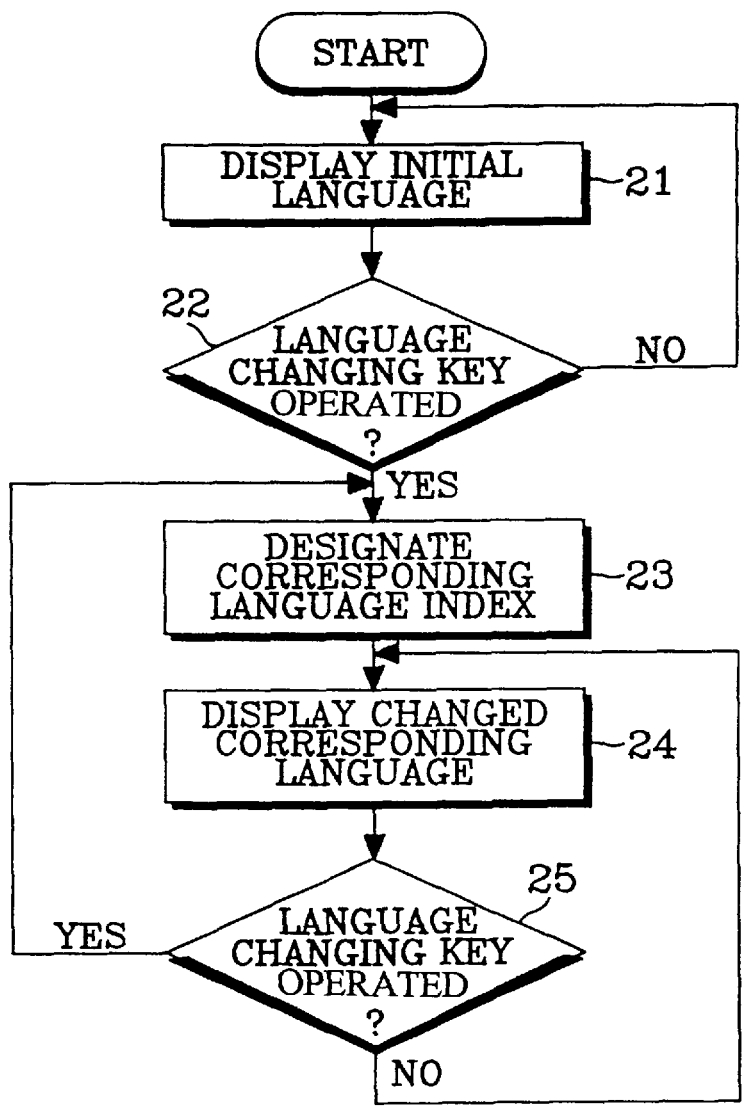
FIG. 2 is a flowchart illustrating the steps of changing an initial language into a corresponding language and displaying various kinds of functions and information in the language selected in accordance with the principles of the present invention.

FIG. 2 is a flowchart illustrating steps of changing an initial language into a corresponding language and displaying all kinds of functions and information in the changed language according to the present invention, comprising the steps of: when the power is turn on, displaying an initial language, checking whether or not a language changing key has been operated and, if the language changing key has been operated, designating a corresponding language index; and changing the initial language into the designated corresponding language and displaying all kinds of functions and operational information in the designated language.

Referring now to FIGS. 1 and 2 collectively, a preferred embodiment of the present invention is more concretely explained hereinafter.

In step 21 of FIG. 2, when the power is turn on, the program displays all kinds of functions or operational information in an initial language by a default. At this time, after checking, in step 22, whether or not a language changing key has been operated, thereby providing a signal from the key matrix 120, if the language changing key has not been operated, the second CPU 80 returns to the above step 21. However, upon the operation of language changing key, the second CPU 80 senses the input of a language changing key signal and informs the first CPU 30 of the input of the language changing key signal through the second interface circuit 90, the main subscriber circuit 40 and the first interface circuit 70. The first CPU 30 designates a corresponding language index stored in the ROM 10 in step 23. Following that, in step 24, the first CPU 30 changes the initial language into the language corresponding to the designated language index and supplies the changed language to the second CPU 80 through the first interface circuit 70 and the main subscriber circuit 40. As a result, the second CPU 80 displays the changed corresponding language on the LCD display 110. Thereafter, as a result of checking, in step 25, whether or not the language changing key has been operated, thereby providing a signal from the key matrix 120, when it has been determined that the language changing key has been operated, the first CPU 30 returns to the aforesaid step 23, thereby repeatedly performing the above steps. To the contrary, when it has determined that the language changing key has not been operated, the first CPU 30 displays the initial language. Hereinabove, the initial language is called as a language displayed by the default value set in a software upon the application of power of the system.

As is apparent from the foregoing, the present invention has an advantage in that it is unnecessary to separately manufacture the key phone for displaying the language according to each country by initializing all kinds of functions or operational information in the key phone system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for displaying multiple languages in a key phone system, comprising the steps of:

providing a key service unit containing a memory and a first central processing unit and at least one key telephone set containing a second central processing unit and a display;

when power to the system is turned on, displaying an initial language on the display of said at least one key telephone set;

checking whether or not a language changing key on said at least one key telephone set has been operated;

if said language changing key has been operated, said first central processing unit designating a corresponding language index; and said first central processing unit changing said initial language into said designated corresponding language and supplying it to said second central processing unit for displaying various functions and operational information in said designated language on said display of said at least one key telephone set.

2. An apparatus for displaying multiple languages in a key phone system comprising:

a display disposed on at least one key telephone set;

a language changing key disposed on said at least one key telephone set;

a control means, comprising a first central processing unit disposed in a key service unit and a second central processing unit disposed in said at least one key telephone set and connected to said display and said language changing key, for displaying an initial language when power to the system is turned on;

said second control processing unit of said control means determining whether or not said language changing key has been operated and said first central processing unit designating a corresponding language index when said language changing key has been operated; and said first central processing unit of said control means changing said initial language into said designated corresponding language and supplying it to said second central processing unit for displaying various of functions and operational information in said designated language on said display.

3. An apparatus for displaying multiple languages in a key phone system comprising:

a key service unit comprising:

a read only memory and a random access memory for storing data and programs and information;

a first central processing unit connected to said read only memory and random access memory for controlling said memories;

a main subscriber circuit connected to a central line for compensating ring detection, pulse transmission, over-power protection and switching loss;

a switch circuit and a trunk circuit, said switching circuit forming a speech path between said trunk circuit and said main subscriber circuit;

a first interface circuit connected to said trunk circuit, switching circuit, and main subscriber circuit, for allowing the passage of data therebetween;

a key telephone set comprising:

a second interface circuit for interfacing power supplied from said main subscriber circuit of said key service unit to said key telephone set and for translating data between said main subscriber circuit and said key telephone set;

a second central processing unit connected to said second interface circuit for receiving and transferring data thereto and for controlling said key telephone set;

a third interface circuit connected to said main subscriber circuit and controlled by said second central processing unit;

a key matrix connected to said second central processing unit for inputting commands to said second central processing unit and including a language changing key;

a handset connected to said third interface circuit;

a tone ringer connected to said third interface circuit for generating an incoming signal;

a display connected to said key matrix and said second central processing unit for displaying information thereon; and a hook switch connected to said display and key matrix and second central processing unit for controlling the interface with a transmitting path in accordance with the state of handset;

said second central processing unit determines that said language changing key has been operated and informs said first central processing unit of the operation of the language changing key through said second interface circuit, main subscriber circuit, and first interface circuit when said language changing key has been operated;

said first central processing unit designating a corresponding language index stored in said read only memory and changing the initial language into a language corresponding to the designated language index and supplying the changed language to said second central processing unit through the first interface circuit and said main subscriber circuit;

said second central processing unit displaying the changed corresponding language on said display.

* * * * *